United States Patent
Ladine

[15] 3,691,845
[45] Sept. 19, 1972

[54] DATA MONITORING SERVO
[72] Inventor: Duane A. Ladine, 9325 Vanalden, Northridge, Calif. 91324
[22] Filed: Dec. 18, 1970
[21] Appl. No.: 99,458

[52] U.S. Cl. .................. 73/432 A, 73/362, 310/91
[51] Int. Cl. ...................... G01r 5/02, G01r 5/12
[58] Field of Search ............ 346/145; 310/91, 75, 90; 318/641, 15, 3; 73/362 A, 362 R, 432 A

[56] References Cited

UNITED STATES PATENTS 2,868,469    1/1959    Sullivan ................. 310/91 X

*Primary Examiner*—S. Clement Swisher
*Attorney*—Beehler, Arant & Jagger

[57] ABSTRACT

An electromechanical data monitoring device for transmitting the reading of a sensor to the rotary input shaft of a conventional recording instrument. The data monitoring device is adapted to be fully supported by its attachment on the input shaft of the instrument. To prevent the device from rotating with the input shaft, it is fastened to the side of the instrument. After the device has transmitted the reading by rotating the input shaft of the instrument in accordance therewith, the power is switched from the device to the power input of the instrument to enable the latter to make a permanent record of the reading.

6 Claims, 6 Drawing Figures

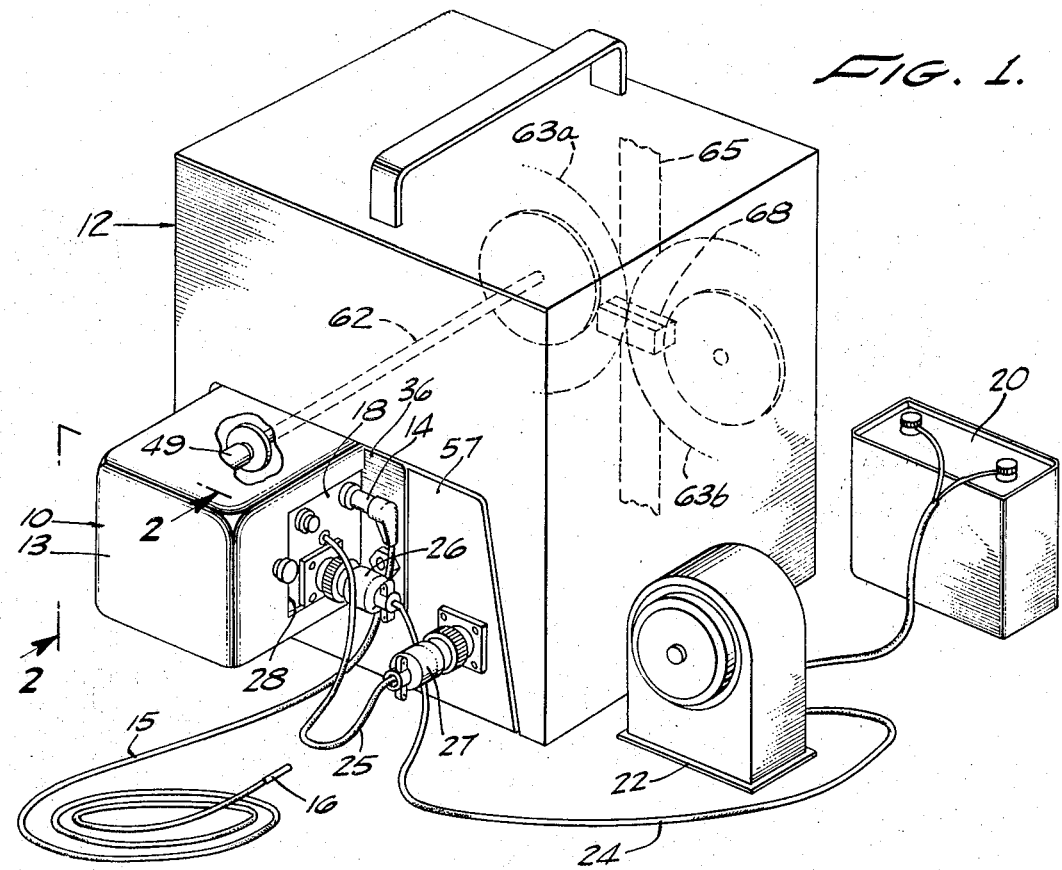
FIG. 1.
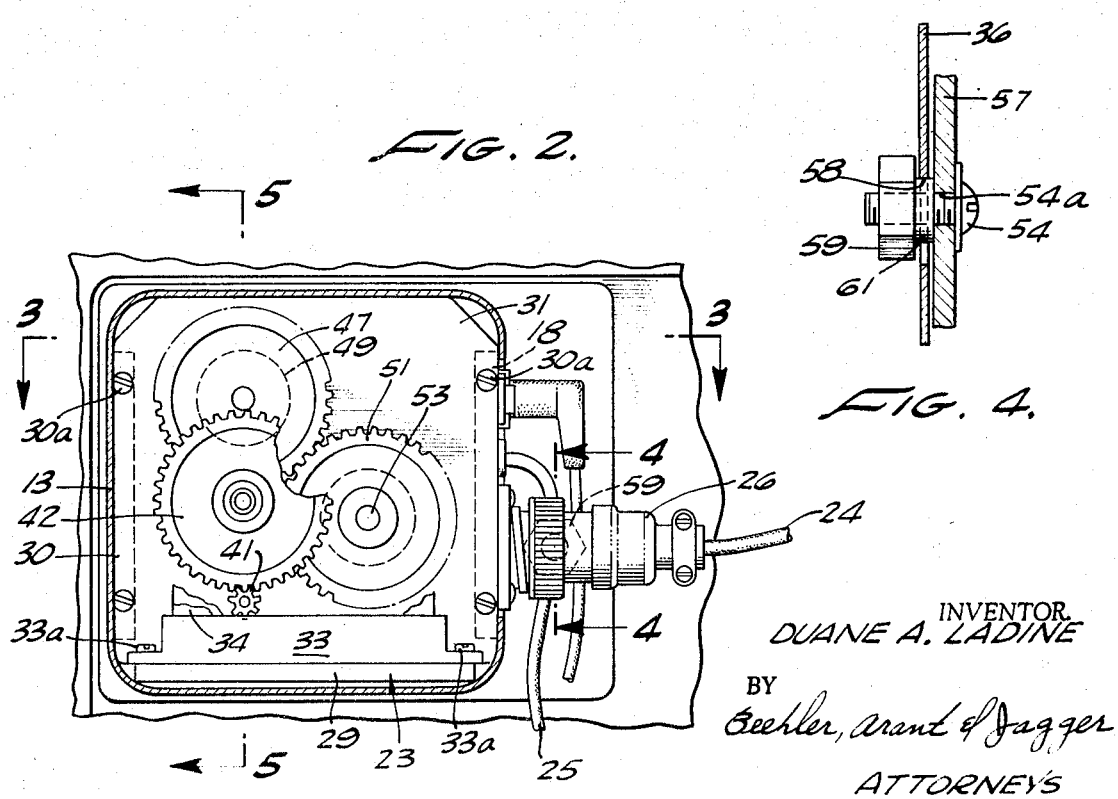
FIG. 2.
FIG. 4.
INVENTOR.
DUANE A. LADINE
BY
Beehler, Arant & Jagger
ATTORNEYS

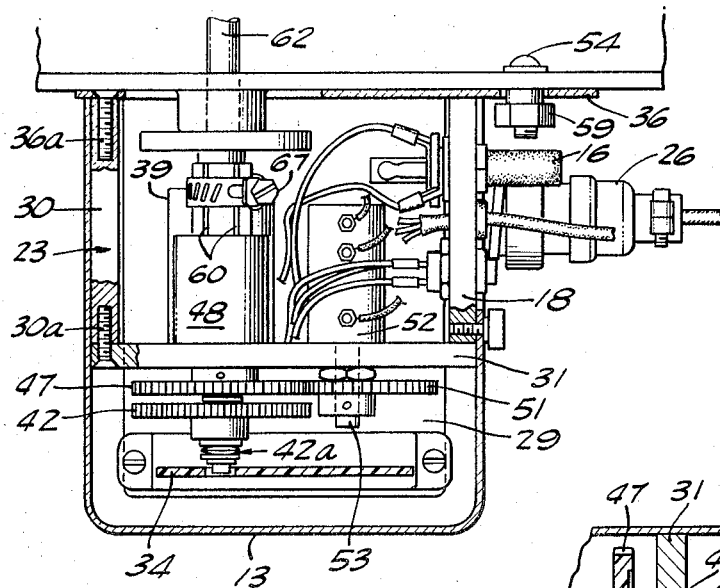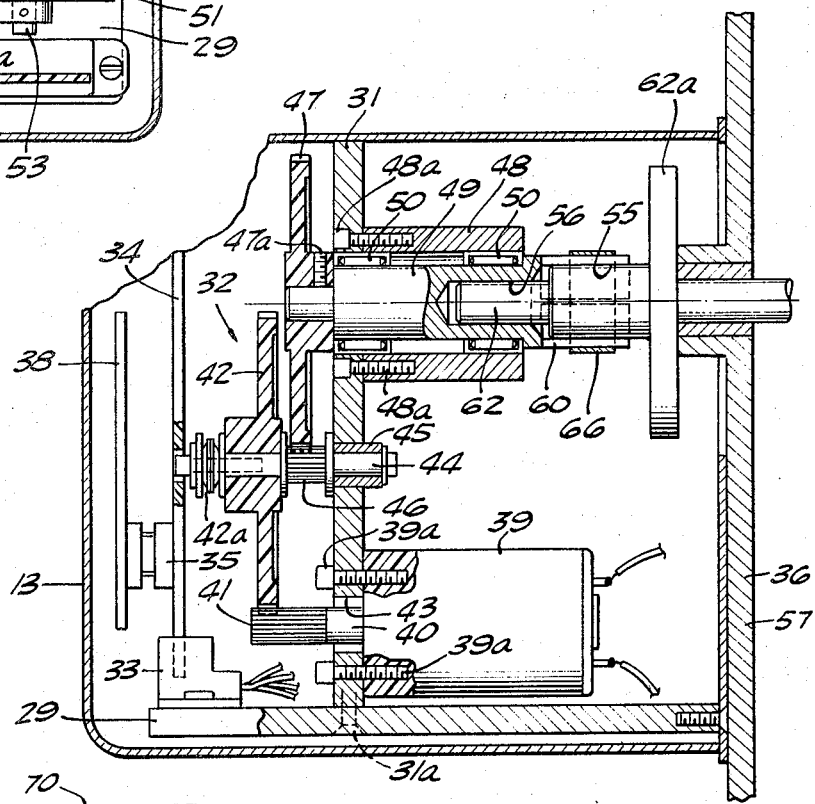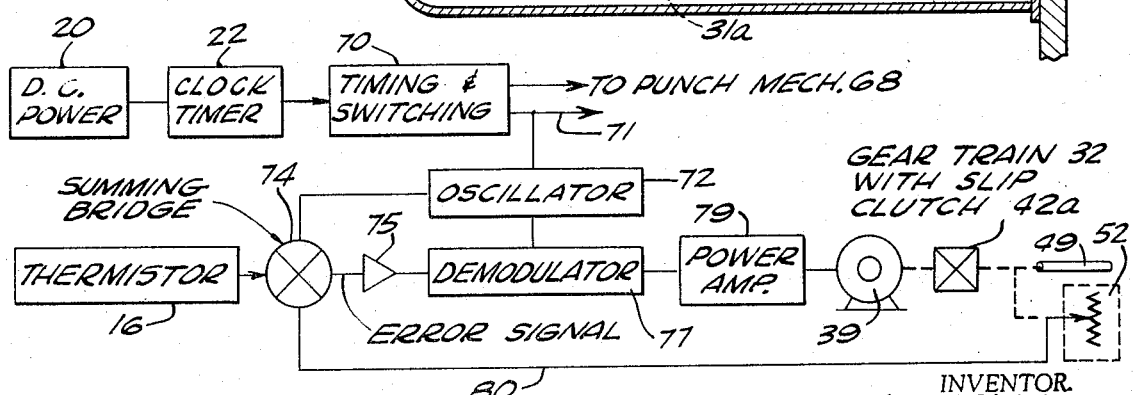

DATA MONITORING SERVO

This invention relates to data monitoring devices and more particularly to such a device especially adapted to be mechanically coupled to actuate a recording instrument.

With the recent rise of the interest in ecology, there has been an increased need of equipment for recording environmental data useful in studying the effects of pollutants on fish, plants and other types of life found in bodies of water such as lakes and streams, for example. Such data includes measurements of the temperature, conductivity, pH factor and dissolved oxygen content of the water. Inasmuch as there is a need for continually monitoring these bodies of water for such data, such devices and the instruments they control must be of the type that can be easily installed along the bank of a lake, for example, and that can be set to be operated at periodic intervals while unattended for the purpose of sampling and providing recordings of the readings of a sensor located in the body of water.

Accordingly, one of the objects of the present invention is to provide a low cost environmental data monitoring device for periodically sampling readings of a sensor or probe and converting these readings into the rotation of an output shaft.

Another object of the invention is to provide a small, light weight data monitoring device which can be simply coupled to the rotary input shaft of an instrument that is to be operated thereby so as to provide a permanent record of the input data.

Still another object of the invention is to provide a data monitoring device which can be simply coupled to a recording instrument and automatically operated therewith for periodically transmitting the input data reading of a sensor to the rotary input shaft of the instrument and initiating the operation of the instrument for making a record of each of the input data readings.

Briefly, the data monitoring device of the present invention comprises an electromechanical device for attachment to the input shaft of a conventional recording instrument. The device includes a box-like frame provided with a transverse wall therein which rotatably supports an output shaft. A motor supported on the frame drives the output shaft through a gear train. A circuit board is held by a receptacle attached to the frame. The circuit board provides a servo circuit which includes a feedback potentiometer that is also attached to the frame. Connected by a lead to the receptacle on the frame is a sensor such as a thermistor which is placed in the water of a lake whose content is to be monitored. Also connected by a lead to the receptacle is a battery which can be switched by a mechanical clock-timer to supply power to the device. The output shaft of the device is adapted to fit on the end of the rotary input shaft of the recording instrument such as to be axially aligned therewith. The frame of the device including the electromechanical components attached thereto are thus supported by the engagement of the output shaft on the input shaft. An extended back plate on the frame is connected to the side of the recording instrument to prevent the frame from rotating with the output shaft. The connection is such that the frame is permitted to wobble in accordance with any variation in the axial orientation of the input shaft.

In the operation of the data monitoring device with a conventional recording instrument, the clock-timer is set to periodically supply the battery power to actuate the circuit on the circuit board which samples the input data from the thermistor and compares the data with the feedback signal from the potentiometer indicative of the present position of the output shaft. The error signal, is used to actuate the d. c. motor for repositioning the output shaft and the potentiometer such that the error signal is reduced to zero. The circuit on the circuit board includes a timing circuit which allows six seconds for the sampling and shaft repositioning operation to take place. The power from the battery is then switched to a lead extending from the device to the recording instrument to provide power to enable the instrument to permanently record the input data that has been transmitted by the data monitoring device to the input shaft of the instrument.

These and other objects, advantages and features of the present invention will become more apparent from a review of the following specification and claims when taken in conjunction with the accompanying drawings wherein:

FIG. 1 is a perspective view showing the data monitoring device of the present invention attached to a punched tape recorder;

FIG. 2 is an end view of the data monitoring device as taken in the direction of arrows 2—2 in FIG. 1;

FIG. 3 is a top plan view of the data monitoring device as taken along line 3—3 of FIG. 2 and showing how it is coupled to the punched tape recorder;

FIG. 4 is a fragmentary sectional view taken along line 4—4 of FIG. 2 showing the details of the attachment of the frame of the data monitoring device to the punched tape recorder;

FIG. 5 is a cross sectional view of the data monitoring device as taken along line 5—5 of FIG. 2; and FIG. 6 is a block diagram of the electrical circuit provided with the data monitoring device.

Referring to FIG. 1 of the drawings, the data monitoring device 10 of the present invention is shown attached on the side of a punched tape recorder 12. The recorder may be any conventional recording instrument that provides for converting the angular position of a rotary input shaft 62 into a coded digit recording on a paper tape 65 such as by use of a punch mechanism 68, for example. The data monitoring device 10, has plugged into the right side wall 18 thereof a jack 14 connected to a length of lead 15 having a sensor such as a thermistor 16 on the end thereof. Also plugged into the right side wall 18 of the device 10 is a connector 26 that has attached thereto a lead 24 which is connected to a battery 20 by way of a mechanical clock-timer 22. An additional lead 25, extending from the side wall 18 of the device 10 has a connector 27 on the end thereof which plugs into the side of the punched tape recorder 12.

The device 10 includes a box-like frame 23 comprising a base plate 29 with a left side wall 30, right side wall 18 and transverse wall 31 which is disposed within the box-like frame 23 such as to be substantially parallel to the side wall of instrument 12 when the device 10 is attached thereto. The bottom end of the wall 31 is connected by screws 31a to the base plate 29 and each of the side walls 18 and 30 is secured to the transverse wall 31 by screws, such as screw 30a shown for wall 30 in FIG. 3. A back plate 36 is attached by screws 36a to the ends of the side walls 18 and 30 of the frame. The back plate 36 has a portion thereof extending beyond the right side wall 18 of the frame. A cover 13 slips over the frame 23 with the ends of the cover touching the back plate 36. An opening 28 is provided on the right side of cover 13 to expose the side wall 18 in which the jack 14 and connector 26 are plugged.

The transverse wall 31 has a cylindrical bearing housing 48 attached thereon by screws 48a. Mounted within housing 48 on a pair of spaced needle bearings 50 is an output shaft 49 with a hollow outer end formed by a large diameter bore 55 leading to a smaller diameter bore 56. A d. c. motor 39 is located near the base plate 29 with its housing attached by screws 39a to transverse wall 31. A gear train 32 is driven by motor drive shaft 40. Gear train 32 includes a pinion 41 on the end of drive shaft 40 which drives a spur gear 42 attached by way of slip clutch 42a on a shaft 44 mounted on a bearing 45 held in the transverse wall 31. A second pinion 46 on the shaft 44 of gear train 32 drives a second spur gear 47 which is secured by a set screw 47a on the end of the output shaft 49. The spur gear 47 also drives a third spur gear 51 which is attached to the shaft 53 of a potentiometer 52. The jack 14 for the thermistor 16 and the connector 26 for the clock-timer and the battery 20 have their respective leads 15 and 24 connected to a receptacle 33 attached on the upper end of base plate 29 by screws 33a. The receptacle 33 provides for receiving a circuit board 34. The motor 39 and the potentiometer 52 also are electrically connected to the receptacle 33. The circuit board 34 has an additional socket thereon for a bridge card 38 as shown in FIG. 5. A bolt 54 extends through a hole 54a in the wall 57 of the punched tape recorder 12 with a close fit and extends through an enlarged opening 58 in the extended portion of the back plate 36 of the device 10. A nut 59 having a shoulder 61 is provided on the bolt 54. The shoulder 61 has a loose fit in the opening 58 of the back plate 36. This bolt 54 is used to prevent the frame 23 of device 10 from rotating when the output shaft 49 is rotated by the motor 39.

As shown in FIG. 5, the punched tape recorder 12 is a conventional instrument provided with a horizontally disposed input shaft 62 extending out of the side wall 57 thereof. As generally indicated in FIG. 1, the input shaft 62 provides for rotating a low order analog code disk 63a which is coupled by gearing (not shown) to a high order analog code disk 63b. Each of the disks is provided with circumferential ridges of varying angular extent located at different radii on the surface thereof. The presence or absence of the ridges along any radius of the disks represent in binary decimal code the number of input shaft revolutions required to advance the code disks from zero position to that particular position. As well known in the art, the code disks can be positioned relative to the punch mechanism 68 such that the ridges on the front surface thereof are used to actuate the proper punches for recording the values of the input data as transmitted by device 10 onto the paper tape 65.

The large diameter portion 55 of the hollow outer end of the rotary output shaft 49 of the device 10 is provided with axial slots 60 so as to enable it to be inserted over the end of the input shaft 62 of the punched tape recorder such that the inner surface of the slotted portion of the output shaft engages the outer surface of the neck of a collar 62a provided on input shaft 62. A clamp 66 encircling the slotted portion 55 of output shaft 49 has its ends connected by screw 67 which, when tightened, enables the clamp to squeeze the slotted portion of shaft 49 together for the purpose of mechanically holding the ends of the shafts together.

It should now be clearly understood that the box-like frame 23 is fully supported by fitting the hollow outer end of the output shaft 49 of device 10 on the outer end of the input shaft 62 of the recording instrument 12. The output shaft 49 is thus axially aligned on the input shaft 62 by which it is fully supported. It should be now clear that the orientation of device 10 is determined by the orientation of the input shaft 62 on which it is mounted. Since the axial alignment of the input shaft 62 may vary, the extended portion of the back plate 36 on frame 23 is provided with an enlarged opening 58 for receiving the shoulder 61 of the nut 59 on bolt 54. Thus, as indicated by the showing in FIG. 4, the bolt 54 prevents the frame 23 from being rotated by the output shaft 49 on which it rides, and the shoulder 61 provides for spacing the nut 59 from the wall 57 such that the back plate 36 can wobble as the output shaft 49 rotates. Such an arrangement insures that the device 10 of the present invention can be mechanically coupled to the input shaft 62 of a standard recording instrument even though the input shaft is permitted to have wide tolerances in the size and axial orientation thereof.

Reference will next be made to FIG. 6 showing a system block diagram of the electrical circuit provided on the circuit board 34 for sampling the input data from thermistor 16 and driving the output shaft 49 in accordance therewith. The d. c. power supplied by battery 20 is connected through the mechanical clock-timer 22 which is provided with a time cam that is set to periodically supply d. c. input power to the timing and switching circuit 70. This circuit 70 responds to the input power from the battery 20 to close a switch which supplies power to an oscillator 72 for operating the summing bridge 74 and a demodulator 77. The closing of the switch in circuit 70 also supplies power via lead 71 to the other electrical components of the system such as the d. c. motor 39 and the potentiometer 52. The timing and switching circuit 70 also includes an internal timer that may be in the form of an R/C network which upon being charged maintains a switch providing power to the circuits closed for six seconds.

The applying of power to the circuits shown in FIG. 6 causes the summing bridge 74, which responds to the input data from the thermistor 16 and to the electrical output 80 of the feedback potentiometer 52 to produce an error signal indicative of the difference of these signals. The summing bridge 74 can be a well known a. c. wheatstone bridge, for example, with one of its resistors variable in accordance with the data input and another of its resistors variable in accordance with the setting of the potentiometer 52. The summing bridge 74 is provided on the bridge card 38 that is separately pluggable in a socket 35 provided on the circuit board 34. Such an arrangement is provided to enable a different summing bridge 74 to be used for each of several different sensors that may be required for providing the input data being monitored by the device 10.

As will now be understood, during the operation of the data monitoring device 10 of the present invention, the thermistor 16 is located in a body of water such as a lake whose water temperature is to be monitored. The clock-timer 22 is set such that once each hour it energizes the circuits on the circuit board 34 in the device 10 with the power from the battery 20. The potentiometer 52 in the device 10 provides a feedback signal on output 80 to summing bridge 74 indicative of the present rotational setting of the output shaft 49. Upon the energizing of the circuits in the device 10, a sampling is made in summing bridge 74 of the reading of the thermistor 16. The thermistor and potentiometer signals are thus combined in the summing bridge 74 to provide an error signal, which after being amplified in integrated circuit amplifier 75 and demodulated in demodulator 77 is fed to power amplifier 79 to provide a signal to actuate the d. c. motor 39. The motor 39 driving through the gear train 32 rotates the output shaft 49 of the device 10 and therefore the input shaft 62 of the punched tape unit 12 to which it is mechanically attached in either a clockwise or counter clockwise direction dependent upon the present reading of the thermistor 16 as compared to the previous reading thereof. The gear 47 which rotates the output shaft 49 of the device 10 also rotates the shaft 53 of the potentiometer 52 by engaging gear 51. This results in a change in the feedback signal applied by a lead 80 to the summing bridge 74 such as to reduce the error signal. When the error signal is zero the output shaft 49 has been rotated to represent the change in the reading or sampling of the thermistor 16. The operation of sampling the input data to determine the error signal and actuating the motor 39 in accordance therewith to adjust the output shaft 49 and the potentiometer 52 is alloted six seconds which is controlled by the timer circuit included in circuit 70 on the circuit board 34. Thus after six seconds the internal timer included in circuit 70 provides for switching off the power being supplied by battery 20 to the circuits in the device 10 and switching the power onto the lead 25 which extends out of device 10 and connects to the punched tape recorder 12 by connector 27. This supplying of power to the recorder 12 by the device 10 initiates the cycle of the punching mechanism 68 thereof for punching out the input data reading represented by the rotary position of shaft 62 as binary coded data on the paper tape 65.

While the form of the invention shown and described herein is adapted to fulfill the objects primarily stated, it will be understood that it is not intended to limit the invention to the specific embodiment described herein, but that modifications may be made within the scope of the appended claims:

What is claimed is:

1. An electromechanical data monitoring device for attachment to a rotary input shaft extending from the side of a recording instrument, said device comprising:
    a frame having a horizontal base and a vertical wall,
    a rotary output shaft rotatably mounted on said wall with the axis thereof extending normal to the surface thereof,
    said output shaft having the end thereof adapted to be connected to the end of the rotary input shaft of said recording instrument with the output shaft axially aligned on the input shaft,
    whereby said frame is fully supported by the end of said output shaft engaging said input shaft,
    a motor attached to said frame for rotatably driving said output shaft when energized,
    a frame member comprising a back plate attached to the end of the frame and extending from the side thereof, and
    means connecting said frame member to the side of said recording instrument for preventing the frame from rotating when said output shaft is rotatably driven by said motor, said means including a bolt extending out of the side of said instrument, and a nut threadably engaging said bolt, said nut provided with a shoulder extending through an enlarged opening in the extended portion of the back plate, said shoulder providing for spacing the nut from the side of said instrument, whereby said back plate is permitted to wobble on said shoulder when said output shaft is rotatably driven by the motor mounted on said frame.

2. An electromechanical data monitoring device for attachment to a rotary input shaft extending from the side of a recording instrument, said device comprising:
    a frame having a horizontal base and a vertical wall,
    a rotary output shaft rotatably mounted on said wall with the axis thereof extending normal to the surface thereof,
    said output shaft having the end thereof adapted to be connected to the end of the rotary input shaft of said recording instrument with the output shaft axially aligned on the input shaft,
    whereby said frame is fully supported by the end of said output shaft engaging said input shaft,
    a motor attached to said frame for rotatably driving said output shaft when energized,
    a frame member attached to said frame and extending from the side thereof,
    means for connecting said frame member to the side of the recording instrument for preventing the frame from rotating when said output shaft is rotatably driven by said motor,
    a circuit means on said frame,
    a sensor for providing input data to said circuit means,
    a d. c. power source, and
    a mechanical clock-timer for periodically connecting said d. c. power source to said circuit means,
    said circuit means operable in response to power from said d. c. power source to sample the input data and to energize said motor to drive said rotary output shaft in accordance therewith, and
    said circuit means including a timing circuit for terminating the operation of sampling the input data and driving the rotary input shaft and for switching the power from said d. c. power source to the recording instrument to enable the latter to record the input data as represented by the rotary position of said input shaft.

3. An electromechanical data monitoring device for attachment to a rotary input shaft extending from the side of a recording instrument, said device comprising:
    a frame having a horizontal base and a vertical wall,
    a rotary output shaft rotatably mounted on said wall with the axis thereof extending normal to the surface thereof, said output shaft having the end thereof adapted to be connected to the end of the rotary input shaft of said recording instrument with the output shaft axially aligned on the input shaft, whereby said frame is fully supported by the end of said output shaft engaging said input shaft, a motor attached to said frame for rotatably driving said output shaft when energized, a frame member attached to said frame and extending from the side thereof, means for connecting said frame member to the side of the recording instrument for preventing the frame from rotating when said output shaft is rotatably driven by said motor, a servo circuit means on said frame, said servo circuit means including a potentiometer attached to said frame for providing signals corresponding to the present position of said rotary output shaft, a sensor for providing input data signals to said servo circuit means, a d. c. power source, and a mechanical clock-timer for periodically connecting said d. c. power source to said servo circuit means, said servo circuit means including a sampling circuit operable in response to power from said d. c. power source for sampling and comparing said input data signals with said potentiometer signals to provide an error signal, and said servo circuit means further including a driving circuit means for energizing said motor to rotate said rotary output shaft and adjust said potentiometer in accordance with said error signal.

4. The invention in accordance with claim 3 including a timing circuit on said frame for terminating the operation of said sampling circuit and said driving circuit after a predetermined time and for switching the power from said d. c. power source to the recording instrument to enable the latter to record the input data as represented by the rotary position of said input shaft.

5. The invention in accordance with claim 4 wherein said d. c. power source is a battery.

6. An electromechanical data monitoring device for attachment to a rotary input shaft extending from the side of a recording instrument, said device comprising:

a frame having a horizontal base and a vertical wall, a rotary output shaft rotatably mounted on said wall with the axis thereof extending normal to the surface thereof, means for drivingly connecting said output shaft to said input shaft, a motor attached to said frame for rotatably driving said output shaft when energized, a frame member attached to said frame and extending from the side thereof, said frame member being connected to the side of the recording instrument for preventing the frame from rotating when said output shaft is rotatably driven by said motor, a circuit means on said frame, a sensor for providing input data to said circuit means, a d. c. power source, and a mechanical clock-timer for periodically connecting said d. c. power source to said circuit means, said circuit means operable in response to power from said d. c. power source to sample the input data provided by said sensor and to energize said motor to drive said rotary output shaft in accordance therewith, and said circuit means including a timing circuit for terminating the operation of sampling the input data and driving the output shaft and for switching the power from said d. c. power source to the recording instrument to enable the latter to record the input data as represented by the rotary position of said input shaft.

* * * * *